A. J. REEDY.
COOKING STOVE.
APPLICATION FILED MAR. 28, 1921.
1,413,781.
Patented Apr. 25, 1922.
3 SHEETS—SHEET 3.
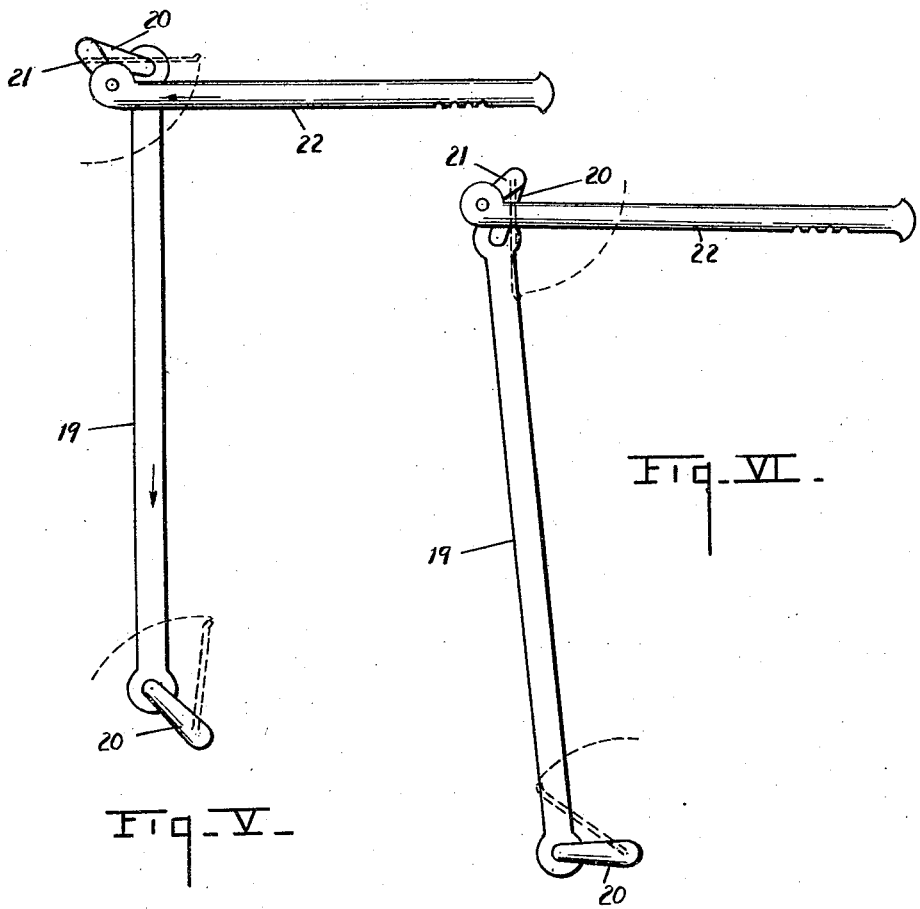
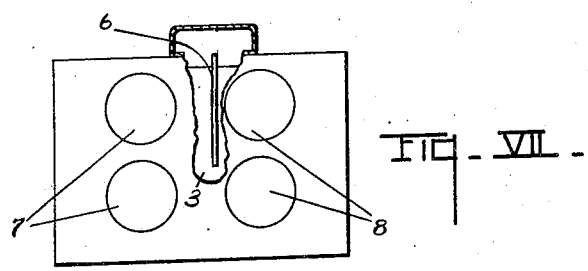
WITNESSES:
INVENTOR.
ALFRED. J. REEDY
BY
ATTORNEYS.

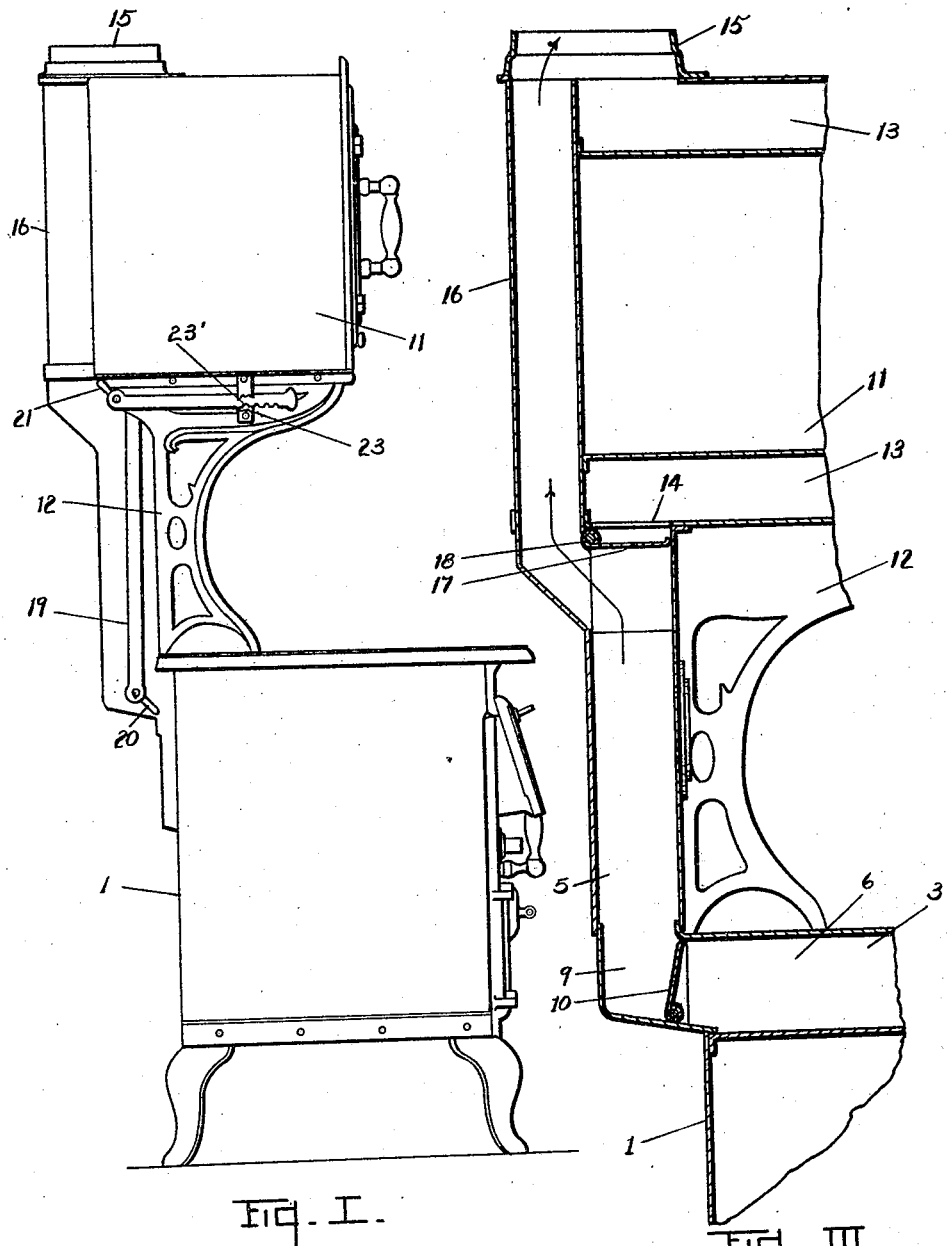

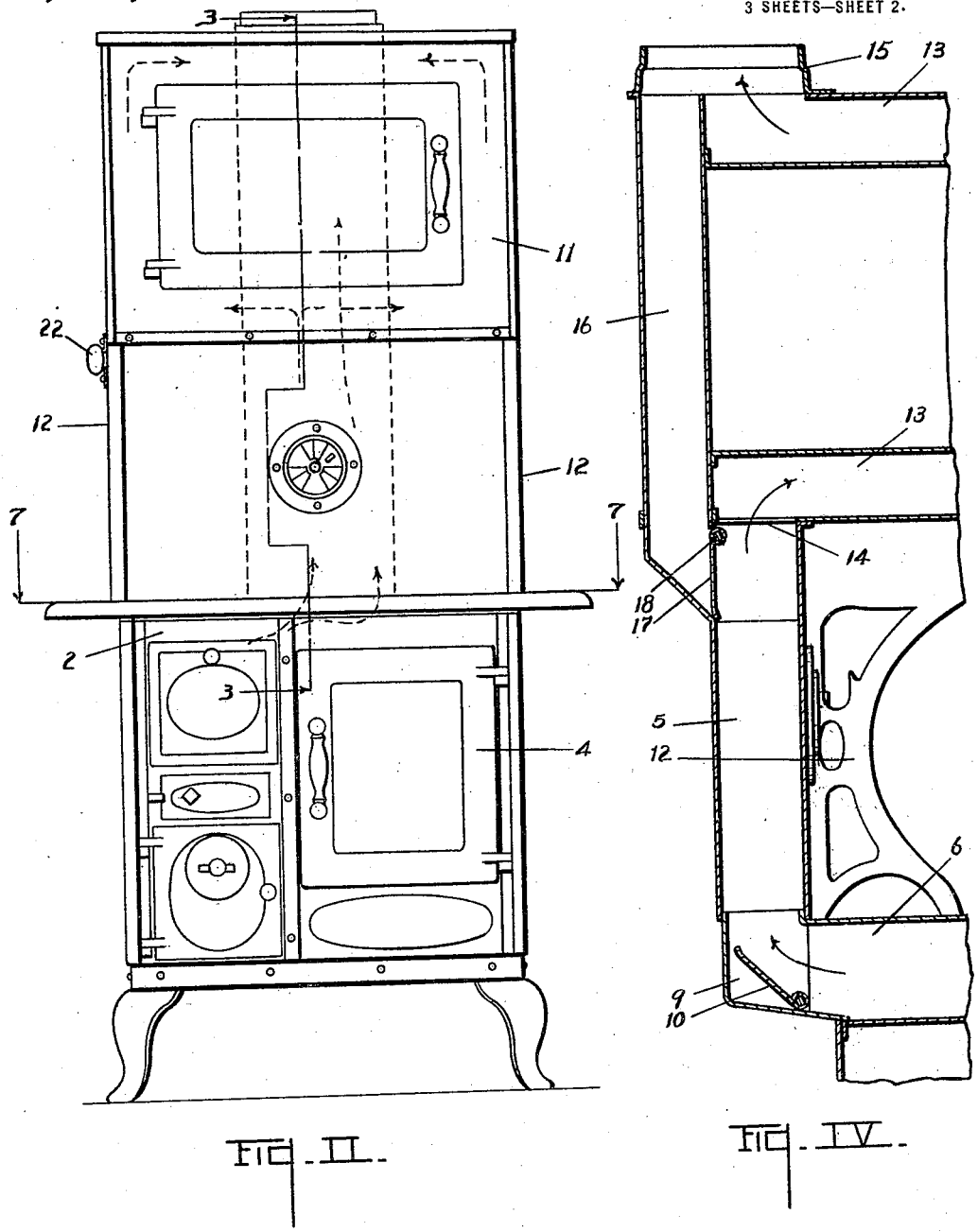

UNITED STATES PATENT OFFICE.

ALFRED J. REEDY, OF BATTLE CREEK, MICHIGAN.

COOKING STOVE.

1,413,781. Specification of Letters Patent. Patented Apr. 25, 1922.

Application filed March 28, 1921. Serial No. 456,063.

*To all whom it may concern:*

Be it known that I, ALFRED J. REEDY, a citizen of the United States, residing at Battle Creek, county of Calhoun, State of Michigan, have invented certain new and useful Improvements in Cooking Stoves, of which the following is a specification.

This invention relates to improvements in cooking stoves.

The main objects of this invention are:

First, to provide an improved cooking stove having an elevated oven which is very efficient.

Second, to provide a cooking stove having an elevated oven which is compact and comparatively simple and economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a left hand elevation of a cooking stove embodying the features of my invention.

Fig. II is a front elevation, the smoke flue at the rear being indicated by dotted lines.

Fig. III is a detail vertical section on a line corresponding to line 3—3 of Fig. II, the damper controlling the oven heating flue and smoke flue by-pass being adjusted to close the oven heating flue.

Fig. IV is a detail vertical section corresponding to that of Fig. III with the damper controlling the oven heating flue, open.

Fig. V is a side view of the damper operating mechanism with the dampers indicated by dotted lines adjusted to the position in Fig. III.

Fig. VI is a similar elevation of the damper operating mechanism with the dampers adjusted to the position shown in Fig. IV.

Fig. VII is a detail horizontal section on a line corresponding to line 7—7 of Fig. II, just above the stove top, a part being broken away showing the arrangement of the baffle in the smoke flue and fire pot chamber.

In the drawing similar reference characters refer to similar parts throughout the several views, and the sectional views are taken looking in the direction of the little arrows at the ends of the section lines.

Referring to the drawing, the body 1 of the stove is provided with a fire pot 2, a fire pot chamber or top flue 3 extending over the top of the stove and a warming oven 4 at the side of the fire pot. At the rear of the stove is a vertical smoke flue 5 into which the chamber 3 opens. A partition or baffle 6 extends from the front of the lower end of this smoke flue and projects forwardly into the top flue 3 providing a direct passage from the fire pot to the smoke flue and an indirect passage around the baffle through the fire pot chamber when the direct passage is closed by the damper.

The stove is provided with lids 7 located above the fire pot and lids 8 located above the fire pot chamber, the products of combustion when passing around the baffle 6 being directed below the rear pair of lids 8.

The direct passage 9 of the smoke flue is controlled by a damper 10. When this damper is open, the products of combustion will, in the main, pass directly to the smoke flue as indicated in Fig. IV. When it is closed, as shown in Fig. III, the products of combustion are compelled to pass around the baffle.

The oven 11 is mounted above the stove top, being supported by end brackets 12, the rear portion of the oven being offset rearwardly so that it is directly above the smoke flue 5. The oven is provided with a surrounding heating flue 13 communicating with the smoke flue through the opening 14 so that the products of combustion pass directly into the smoke flue against the bottom of the oven and thence around the oven and out the discharge 15 at the top. At the rear of the oven is a smoke flue by-pass 16 connected at its upper end to the smoke flue which is adapted to receive the stove pipe.

The damper 17 is pivoted at 18 so that when swung to a horizontal position it closes the oven heating flue opening 14 and when swung to a vertical position it closes the by-pass flue 16 and may be adjusted to an intermediate position directing part of the products of combustion through the oven flue and a part through the by-pass.

For convenience in manipulation the dampers 10 and 17 are connected by the link 19, the dampers being provided with arms 20 to which the link is connected. The upper damper is provided with an arm 21 to which the actuating bar 22 is connected, the bar being supported by a strap guide 23 on the side of one of the oven supporting brackets so that its forward end is in a convenient position to be grasped when the operator is standing at the front of the stove. The underside is notched for adjustment on a lug 23' in the guide 23.

With this arrangement of parts, it is found that the oven is effectively heated for baking and other purposes, that the heating thereof may be quite accurately controlled and that the stove is economical in the matter of fuel.

I have illustrated and described an adaptation of my improvements which I have found very practical. I have not attempted to describe certain modifications and adaptations which might be desirable in embodying my improvements to other structures as I believe the disclosure made will enable those skilled in the art to which my invention relates to embody or adapt the same as may be desired.

Having thus described my invention, what I claim as new and desire to secure by Letters Patent, is:

1. The combination in a cooking stove including a fire pot and a top flue and lids over said fire pot and chamber, of a vertical smoke flue at the rear into which said top flue opens, a vertically disposed baffle in front of the lower end of said smoke flue extending forwardly into said top flue providing a direct passage from said fire pot to said smoke flue and a passage around said baffle, a damper for the direct passage, an oven supported in an elevated position and provided with a surrounding heating flue with a discharge at the top, said oven being offset rearwardly over said smoke flue which has a direct delivery connection to its said heating flue, a smoke flue by-pass disposed at the rear of said oven, a damper common to said oven heating and by-pass flues adapted to close one as the other is opened and vice versa, and operating connections for said dampers arranged so that when the baffle damper is open the oven heating flue is opened and vice versa.

2. The combination in a cooking stove including a fire pot and a top flue, of a vertical smoke flue at the rear into which said top flue opens, a vertically disposed baffle in front of the lower end of said smoke flue extending forwardly into said top flue providing a direct passage from said fire pot to said smoke flue and a passage around said baffle, a damper for the direct passage, an oven supported in an elevated position and provided with a surrounding heating flue to which said smoke flue delivers, said heating flue having a discharge at the top, a smoke flue by-pass disposed at the rear of said oven, a damper common to said oven heating and by-pass flues adapted to close one as the other is opened and vice versa, and operating connections for said dampers arranged so that when the baffle damper is open the oven heating flue is opened and vice versa.

In witness whereof, I have hereunto set my hand and seal in the presence of two witnesses.

ALFRED J. REEDY. [L. S.]

Witnesses:
WILLIAM FLEMING,
LOLA E. GARRIOTT.